United States Patent [19]

Formolo

[11] Patent Number: 5,821,282
[45] Date of Patent: Oct. 13, 1998

[54] SELF LUBRICATING BRAKE SHOE MATERIAL

[75] Inventor: Joseph F. Formolo, Laurinburg, N.C.

[73] Assignee: Westinghouse Air Brake Company, Wilmerding, Pa.

[21] Appl. No.: 548,874

[22] Filed: Oct. 26, 1995

[51] Int. Cl.⁶ .................................................. C08J 5/14
[52] U.S. Cl. ............................ 523/149; 524/15; 524/35; 524/425; 524/432; 524/433; 524/444; 524/445; 523/152; 523/153; 523/156; 523/157; 188/251 A
[58] Field of Search ...................................... 523/149, 152, 523/156, 153, 157; 524/15, 35, 425, 432, 433, 445, 444; 188/251 A

[56] References Cited

U.S. PATENT DOCUMENTS

| | | | |
|---|---|---|---|
| 4,003,451 | 1/1977 | Torok | 188/62 |
| 4,178,278 | 12/1979 | Reynolds Jr. | 523/157 |
| 4,352,750 | 10/1982 | Eschen | 523/156 |
| 4,388,423 | 6/1983 | Kaufman et al. | 523/153 |
| 4,463,835 | 8/1984 | Murphy et al. | 188/52 |
| 4,781,275 | 11/1988 | Olsen | 188/251 A |
| 4,795,007 | 1/1989 | Murphy et al. | 188/207 |
| 5,196,471 | 3/1993 | Rangaswamy et al. | 524/406 |
| 5,474,842 | 12/1995 | Hoiness | 428/327 |

*Primary Examiner*—Marion E. McCamish
*Assistant Examiner*—John J. Guarriello
*Attorney, Agent, or Firm*—James Ray & Associates

[57] ABSTRACT

A self lubricating material for use in a castable material from which a predetermined component having at least one friction surface is to be manufactured. Such self lubricating type material consisting essentially of cellulose in the range of between about 4.0 weight percent and about 9.0 weight percent, resin in the range of between about 15.0 weight percent and about 20.0 weight percent, vermiculite in the range of between about 20.0 weight percent and about 25.0 weight percent, nut shells in a range of between about 12.0 weight percent and about 20.0 weight percent, fluorspar in a range of between about 11.0 weight percent and about 14.0 weight percent and oil in the range of between about 20.0 weight percent and about 26.0 weight percent.

8 Claims, No Drawings

SELF LUBRICATING BRAKE SHOE MATERIAL

FIELD OF THE INVENTION

The present invention relates, in general, to a self lubricating type material and, more particularly, the instant invention relates to a unique self lubricating type material which can be readily incorporated into the matrix of a predetermined castable type friction material thereby providing a predetermined amount of lubrication to a surface disposed on such friction type material which will be frictionally engaged with another surface during service and, still more particularly, the present invention relates to a new self lubricating type material which can be advantageously incorporated into the matrix of a castable friction type brake shoe utilized in the braking system of a transit type railway vehicle.

BACKGROUND OF THE INVENTION

As is generally well known in the art, there are numerous applications where at least a portion of the surface of a first component must be frictionally engaged with at least a portion of the surface of a second component. In many such cases, although it is desirable and/or necessary to have a predetermined amount of such friction it is, nevertheless, still important to control the amount of friction being generated. It is also known well that, at least in a number of applications, these frictionally engaged surfaces will normally be subjected to rather severe loads during their intended service.

Although the present invention is not to be limited either thereto or thereby, one such critical application which illustrates the usefulness for the invented self lubricating type of material is in the formulation of the composition for a railway vehicle type brake shoe. Particularly, a brake shoe used on a passenger transit type vehicle.

It is quite well known in the passenger transit industry, for example, that there exists the desirability of; first, inhibiting as much as possible the noise being generated during the braking operation on a transit type vehicle; second, reducing the amount of wear and detrimental metal inclusion encountered to an acceptable level; third, stabilizing the required friction level in both wet and/or dry conditions which are normally encountered during in track service of such transit type vehicle due to the outdoor environment; fourth, reducing the aggressivity of the tread wheel surface on the brake shoe; fifth, achieving a substantial reduction in the amount of disagreeable odors which are normally generated during a braking operation; and, sixth, minimizing as much as possible the fumes and/or smoke generated during braking.

Prior to the present invention, in an attempt to achieve the desirable features described above, it is known by applicant that these transit type vehicle brake shoes were normally manufactured from preselected wood products. However, these wooden type prior art brake shoes were not always totally acceptable for this brake shoe application for a variety of reasons. One such reason, for example, is the variability of the wood which was often times encountered from lot to lot. Such detrimental variability in the wooden type brake shoes normally led to rather inconsistent braking performance.

In addition, the amount of time necessary for successfully processing these wooden brake shoes was found to be not only excessive but also costly. Such processing time may be on the order of several months due to curing, shaping and impregnating the wood to be used in the manufacturing of these prior art type wooden brake shoes. Such excessive processing time requires a relatively high inventory be maintained by the brake shoe manufacturer in order to achieve an acceptable lead time for delivery to the customer. A further disadvantage of these wooden type brake shoes is that high brake shoe and excessive tread wear will occur due to the carbonization and erratic behavior of such wooden brake shoes.

SUMMARY OF THE INVENTION

According to a first aspect, the instant invention provides a self lubricating type material for use in a predetermined castable type friction material from which a predetermined component having at least one friction surface is to be manufactured. Such self lubricating type material consisting essentially of, cellulose in the range of between about 4.0 weight percent and about 9.0 weight percent, resin in the range of between about 15.0 weight percent and about 20.0 weight percent, vermiculite in the range of between about 20.0 weight percent and about 25.0 weight percent, nut shells in a range of between about 12.0 weight percent and about 20.0 weight percent, fluorspar in a range of between about 11.0 weight percent and about 14.0 weight percent and a preselected oil in the range of between about 20.0 weight percent and about 26.0 weight percent.

According to a second aspect, the present invention provides a railway vehicle brake shoe having a self lubricating material incorporated therein. The railway vehicle brake shoe comprising a friction matrix material present in such brake shoe in a range of generally between about 75.0 weight percent and about 80.0 weight percent. This friction matrix material includes fibers selected from the group consisting of mineral fibers, organic fibers and mixtures thereof. These fibers are present in the friction matrix material in a range of between about 24.0 weight percent and about 32.0 weight percent. Inorganic fillers selected from the group consisting of zinc oxide, calcium carbonate, clay, barytes, fluorspar, sodium carbonate, silica, surfactants and various mixtures thereof are present in such friction matrix material in a range of between about 9.0 weight percent and about 15.0 weight percent. Such friction matrix material further includes organic fillers and binders selected from the group consisting of nut shells, friction dust, elastomer modified cashew friction particles, carbon black, graphite, carbon fines, oils, acrylonitrile rubber, styrene-butadiene, curable phenolic resin and various mixtures thereof. These organic fillers and binders are present in such friction matrix material in a range of between about 50.0 weight percent and about 65.0 weight percent. Finally, such friction matrix material has certain crosslinking agents which are selected from the group consisting of sulfur, hexamethylenetetramine, preselected accelerators, preselected activators and various mixtures thereof present therein in a concentration of generally less than about 1.0 weight percent. The railway vehicle brake shoe further includes a self lubricating material present in such brake shoe in a range of generally between about 20.0 weight percent and about 25.0 weight percent. The self lubricating material includes a preselected cellulose in the range of generally between about 4.0 weight percent and about 9.0 weight percent. A preselected resin in the range of generally between about 15.0 weight percent and about 20.0 weight percent is present in such self lubricating material. Such self lubricating material also includes vermiculite, having a predetermined particle size, which is present in the range of generally between about 20.0 weight percent and about 25.0 weight percent. Preselected nut shells are likewise present in such self lubricating material in a range of generally between about 12.0 weight percent and about 20.0 weight percent. Additionally, fluorspar is present in such self lubricating material in a range of generally between about 11.0 weight percent and about 14.0 weight percent and a preselected oil is also present in the self lubricating material in the range of generally between about 20.0 weight percent and about 26.0 weight percent.

According to a final aspect, the present invention provides a method of producing a predetermined component having a self lubricating friction surface disposed thereon. This method includes the steps of first determining a size, shape and an application for a component to be manufactured. Thereafter, determining and providing a required amount of a castable type friction matrix material for such component determined to be manufactured and further determining and providing a required amount of a self lubricating material for the component. Next, mixing such castable type friction matrix material provided into a homogeneous mass with the self lubricating material provided. Then, placing the homogeneous mass thus formed into a mold. Heating the homogeneous mass in such mold for a predetermined time period and at a predetermined temperature which are at least sufficient for curing such homogeneous mass and, thereafter, removing the predetermined component from the mold after such curing.

OBJECTS OF THE INVENTION

It is, therefore, one of the primary objects of the present invention to provide a self lubricating type material capable of being easily incorporated into the matrix of a predetermined castable type friction material.

Another object of the present invention is to provide a self lubricating type material which can be easily incorporated into the formulation of the composition for a friction brake shoe used on a railway type vehicle.

Still another object of the present invention is to provide a self lubricating type material which can be easily incorporated into the formulation of the composition of a friction brake shoe that will enable the partial slip and retardation rates required to be accomplished in either wet or dry conditions that can normally be encountered during operation of a passenger transit type vehicle.

Yet another object of the present invention is to provide a self lubricating type material which can be easily incorporated into the formulation of the composition of a friction brake shoe that will substantially minimize the noise generated during a braking operation of a passenger transit type vehicle.

A further object of the present invention is to provide a self lubricating type material which can be easily incorporated into the formulation of the composition of a friction brake shoe that will enhance the life of the brake shoe and wheel tread disposed on a passenger transit type vehicle.

An additional object of the present invention is to provide a self lubricating type material which can be easily incorporated into the formulation of the composition of a friction brake shoe that will inhibit metal inclusion.

Still yet another object of the present invention is to provide a self lubricating type material which can be easily incorporated into the formulation of the composition of a friction brake shoe that will stabilize the friction level in both wet and dry conditions encountered in a braking operation on a passenger transit type vehicle.

Yet still another object of the present invention is to provide a self lubricating type material which can be easily incorporated into the formulation of the composition of a friction brake shoe that will substantially reduce undesirable odors and/or fumes generated during a braking operation on a passenger transit type vehicle.

It is an additional object of the present invention to provide a self lubricating type material which can be easily incorporated into the formulation of the composition of a friction brake shoe that will enable a reduction in inventory requirements.

A still further object of the present invention is to provide a self lubricating type material which can be easily incorporated into the formulation of the composition of a friction brake shoe that will significantly increase wheel life and substantially reduce the cost associated with wheel replacement on a passenger transit type vehicle.

Another object of the present invention is to provide a method of producing a castable type friction material having a predetermined amount of lubrication incorporated therein adjacent a friction surface thereof.

In addition to the various objects and advantages of the present invention which have been described in detail above various other objects and advantages of the invention will become much more readily apparent to those persons who are particularly skilled in the relevant friction art from the following more detailed description of the such invention.

BRIEF DESCRIPTION OF A PRESENTLY PREFERRED AND VARIOUS ALTERNATIVE EMBODIMENTS OF THE INVENTION

In a first and broadest aspect, the present invention provides a formulation for a self lubricating type material which can be easily incorporated into the matrix of a castable type friction material from which a predetermined component having a friction surface is to be manufactured.

The formulation for such self lubricating material consists essentially of a preselected cellulose generally in the range of between about 4.0 weight percent and about 9.0 weight percent.

In a presently preferred embodiment of the invention, the preselected cellulose is sodium carboxymethyl cellulose. Additionally, such sodium carboxymethyl cellulose will, preferably, be present in such self lubricating material generally in a range of between about 6.0 weight percent and about 8.0 weight percent.

A preselected resin is included as another element in the formulation of this self lubricating material and will be present generally in the range of between about 15.0 weight percent and about 20.0 weight percent.

Such preselected resin is preferably a phenolic resin and is present in such self lubricating material in a range of between about 16.0 weight percent and about 18.0 weight percent.

The self lubricating material, also, includes vermiculite, having a predetermined particle size. Such vermiculite is present in the formulation generally in the range of between about 20.0 weight percent and about 25.0 weight percent.

In the presently preferred embodiment, such vermiculite will exhibit a particle size in which more than about 90.0 percent will pass through a 70-mesh screen. Further in the presently preferred embodiment, such vermiculite will be present in this self lubricating material in a range of between about 22.0 weight percent and about 24.0 weight percent.

Preselected nut shells are another part of the self lubricating formulation of the present invention. Such nut shells are present generally in a range of between about 12.0 weight percent and about 20.0 weight percent.

In the presently preferred embodiment of this invention, such preselected nut shells are walnut shells and are present in the self lubricating material in a range of between about 13.0 weight percent and about 17.0 weight percent.

The self lubricating material of the present invention further includes fluorspar as one of the elements in the formulation. Such fluorspar is present in such formulation generally in a range of between about 11.0 weight percent and about 14.0 weight percent.

Preferably, such fluorspar is present in such self lubricating material in a range of between about 12.0 weight percent and about 14.0 weight percent.

The final essential element of the self lubricating material, of the present invention, is a preselected oil which is present in the formulation generally in the range of between about 20.0 weight percent and about 26.0 weight percent.

In the presently preferred embodiment such preselected oil is peanut oil and will be present in such self lubricating material in a range of between about 23.0 weight percent and about 26.0 weight percent.

In preparing this mixture sufficient water is added to the components in the formulation to make it into a putty-like consistency. The mixture is then blended to insure homogeneity and is, thereafter, cured in an oven at a temperature of generally between about 250 degrees F. and about 350 degrees F. for a period of time of generally between about 3.0 hours to about 5.0 hours. After the curing, the mixture is then ground, for example, in a hammermill until it will pass through a one-eighth inch screen so that it can be blended with other castable type materials as will be described hereinafter.

In the presently preferred embodiment of the invention the curing temperature will be between about 270 degrees F. and about 290 degrees F. and the curing time will be between about 3.5 hours and about 4.5 hours.

According to a second unique aspect, the present invention provides a railway vehicle type brake shoe having the above described self lubricating material incorporated therein to provide a predetermined amount of lubrication to the friction surface of such brake shoe which will be in contact with a wheel tread during a brake application on such railway vehicle.

Such railway vehicle type brake shoe comprising a friction matrix material present in such brake shoe generally in a range of between about 75.0 weight percent and about 80.0 weight percent.

In the presently preferred embodiment of this aspect of the invention, such friction matrix material is present in such brake shoe generally in a range of between about 77.0 weight percent and about 79.0 weight percent.

Such friction matrix material further includes fibers which are selected from the group consisting of certain mineral fibers, certain organic fibers and various mixtures thereof. These fibers are present in this friction matrix material generally in a range of between about 24.0 weight percent and about 32.0 weight percent.

In the presently preferred embodiment of the railway vehicle brake shoe having a self lubricating type material incorporated therein, such fibers present in the friction matrix material are a mixture of preselected mineral fibers and preselected organic fibers. Additionally, in this presently preferred embodiment such preselected mineral fibers are present in the mixture of such fibers generally in a range of between about 14.0 weight percent and about 18.0 weight percent.

The railway vehicle brake shoe friction matrix material further includes inorganic fillers which are selected from the group consisting of zinc oxide, calcium carbonate, clay, barytes, fluorspar, sodium carbonate, silica, preselected surfactants and various mixtures thereof. Such inorganic fillers are present in this friction matrix material generally in a range of between about 9.0 weight percent and about 15.0 weight percent.

In the presently preferred embodiment of such railway vehicle brake shoe, these inorganic fillers are present in the friction matrix material in a range of between about 12.0 weight percent and about 14.0 weight percent.

In addition, the friction matrix material for the railway vehicle brake shoe includes a number of preselected organic fillers and preselected binders. Such organic fillers and binders are selected from the group consisting of friction dust, elastomer modified cashew friction particles, carbon black, graphite, carbon fines, oils, acrylonitrile rubber, styrene-butadiene, curable phenolic resin and various mixtures thereof. These preselected organic fillers and preselected binders are present in such friction matrix material generally in a range of between about 50.0 weight percent and about 65.0 weight percent.

In the presently preferred friction matrix material for such railway vehicle brake shoe such preselected organic fillers are present in a range of between about 33.0 weight percent and about 37.0 weight percent and such preselected binders are present in the friction matrix material in a range of between about 22.0 weight percent and about 25.0 weight percent.

Another essential element of the friction matrix material is certain crosslinking agents which are selected from the group consisting of sulfur, hexamethylenetetramine, preselected accelerators, preselected activators and various mixtures thereof.

These crosslinking agents are present, in the presently preferred embodiment of such friction matrix material, in a concentration of generally less than about 1.0 weight percent. In the preferred embodiment of the invention such crosslinking agents are a mixture of sulfur, hexamethylenetetramine, preselected accelerators and preselected activators.

The railway vehicle brake shoe of the present invention further includes a self lubricating type material which is present in such brake shoe in a range of generally between about 20.0 weight percent and about 25.0 weight percent. In the presently preferred railway vehicle brake shoe having this self lubricating material incorporated therein, such self lubricating type material is present in the brake shoe in a range of between about 21.0 weight percent and about 23.0 weight percent.

For the sake of brevity it should be noted that the presently preferred self lubricating material for use in this brake shoe is substantially the same self lubricating material which has been described in considerable detail above. Accordingly, a detailed description of this self lubricating material will not be repeated here.

In a final aspect, the present invention provides a method of producing a predetermined component having a self lubricating friction surface disposed thereon. Such method includes the steps of first determining each of a size, shape and an intended application for a component to be manufactured. Next, determining and providing a required amount of a castable type friction matrix material for such component to be manufactured. The method also requires determining and providing a required amount of a self lubricating material for such component to be manufactured in order to provide the desired amount of lubrication on the friction surface.

Once the required amounts of friction matrix material and self lubricating material have been determined and provided the method includes the step of mixing such castable friction matrix material into a homogeneous mass with such self lubricating material. According to this method such homogeneous mass formed is then placed into a mold.

After placing such homogeneous mass in such mold it is then pressed and heated, according to the method of the present invention, for a predetermined time and at a predetermined temperature and predetermined pressure which are at least sufficient for curing such homogeneous mass and, thereafter removing such predetermined component from such mold after such curing has been achieved.

According to the present invention, when such predetermined component is a railway vehicle brake shoe the method will include the additional step of providing a metal backing plate onto which the homogeneous mass is cured. Additionally, in this case, such method will include the additional step of providing a mechanical locking arrangement between such metal backing plate and such homogeneous mass.

In the presently preferred embodiment of the invention, the predetermined time for heating such homogeneous mass described above is between about 1.0 hour and about 4.0 hours and the predetermined temperature for heating such homogeneous mass is between about 250 degrees F. and about 400 degrees F. and the predetermined pressure is between about 1,200 psi and about 1,800 psi. As would generally be expected, as the heating temperature becomes higher the heating time required will be reduced.

Although a number of presently preferred embodiments and various alternative embodiments of the present invention have been described in detail above it is to be understood that various other adaptations and modifications of the present invention can be envisioned by those persons who are skilled in the relevant art without departing from either the spirit of the invention or the scope of the appended claims.

I claim:

1. A railway vehicle brake shoe having a self lubricating material incorporated therein, said railway vehicle brake shoe comprising:
   (a) a friction matrix material present in said brake shoe in a range of between about 75.0 weight percent and about 80.0 weight percent, said friction matrix material including;
      (i) fibers selected from the group consisting of mineral fibers, organic fibers and mixtures thereof, said fibers are present in said friction matrix material in a range of between about 24.0 weight percent and about 32.0 weight percent,
      (ii) inorganic fillers selected from the group consisting of zinc oxide, calcium carbonate, clay, barytes, fluorspar, sodium carbonate, silica, surfactants and mixtures thereof, said inorganic fillers are present in said friction matrix material in a range of between about 9.0 weight percent and about 15.0 weight percent,
      (iii) organic fillers and binders selected from the group consisting of friction dust, elastomer modified cashew friction particles, carbon black, graphite, carbon fines, oils, acrylonitrile rubber, styrene-butadiene, curable phenolic resin and mixtures thereof, said organic fillers and binders are present in said friction matrix material in a range of between about 50.0 weight percent and about 65.0 weight percent, and
      (iv) crosslinking agents selected from the group consisting of sulfur, hexamethylenetetramine, accelerators, activators and mixtures thereof, said crosslinking agents are present in said friction matrix material in a concentration of less than about 1.0 weight percent; and
   (b) a self lubricating material present in said brake shoe in a range of between about 20.0 weight percent and about 25.0 weight percent, said self lubricating material including;
      (i) a cellulose, said cellulose being present in said self lubricating material in the range of between about 4.0 weight percent and about 9.0 weight percent;
      (ii) a resin, said resin being present in said self lubricating material in the range of between about 15.0 weight percent and about 20.0 weight percent;
      (iii) vermiculite, being present in said self lubricating material in the range of between about 20.0 weight percent and about 25.0 weight percent;
      (iv) nut shells, said nut shells being present in said self lubricating material in a range of between about 12.0 weight percent and about 20.0 weight percent;
      (v) fluorspar, said fluorspar being present in said self lubricating material in a range of between about 11.0 weight percent and about 14.0 weight percent; and
      (vi) an oil, said oil being present in said self lubricating material in the range of between about 20.0 weight percent and about 26.0 weight percent.

2. A railway vehicle brake shoe having a self lubricating material incorporated therein, according to claim 1, wherein said friction matrix material is present in said railway vehicle brake shoe generally in a range of between about 77.0 weight percent and about 79.0 weight percent.

3. A railway vehicle brake shoe having a self lubricating material incorporated therein, according to claim 1, wherein said fibers present in said friction matrix material are a mixture of said mineral fibers and said organic fibers.

4. A railway vehicle brake shoe having a self lubricating material incorporated therein, according to claim 3, wherein said mineral fibers are present in said mixture of said fibers generally in a range of between about 14.0 weight percent and about 18.0 weight percent.

5. A railway vehicle brake shoe having a self lubricating material incorporated therein, according to claim 1, wherein said inorganic fillers are present in said friction matrix material generally in a range of between about 12.0 weight percent and about 14.0 weight percent.

6. A railway vehicle brake shoe having a self lubricating material incorporated therein, according to claim 1, wherein said organic fillers are present in said friction matrix material generally in a range of between about 33.0 weight percent and about 37.0 weight percent and said binders are present in said friction matrix material generally in a range of between about 22.0 weight percent and about 25.0 weight percent.

7. A railway vehicle brake shoe having a self lubricating material incorporated therein, according to claim 6, wherein said organic fillers and said binders are present in said friction matrix material generally in a range of between about 57.0 weight percent and about 61.0 weight percent.

8. A railway vehicle brake shoe having a self lubricating material incorporated therein, according to claim 2, wherein said self lubricating material is present in said railway vehicle brake shoe generally in a range of between about 21.0 weight percent and about 23.0 weight percent.

* * * * *